(No Model.)
M. E. JONES.
FISHING SEINE.
No. 462,258. Patented Nov. 3, 1891.
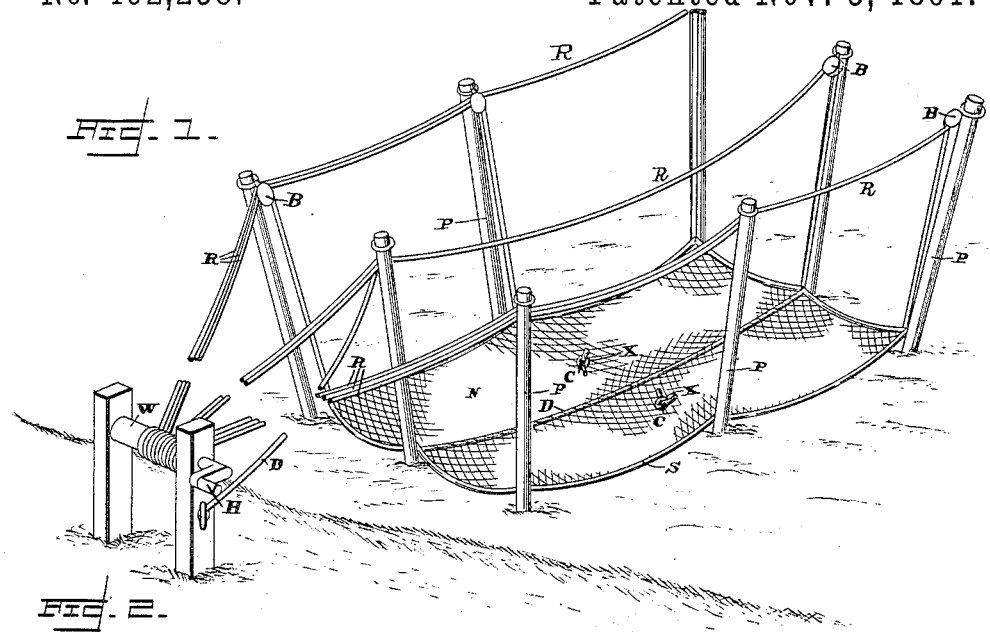
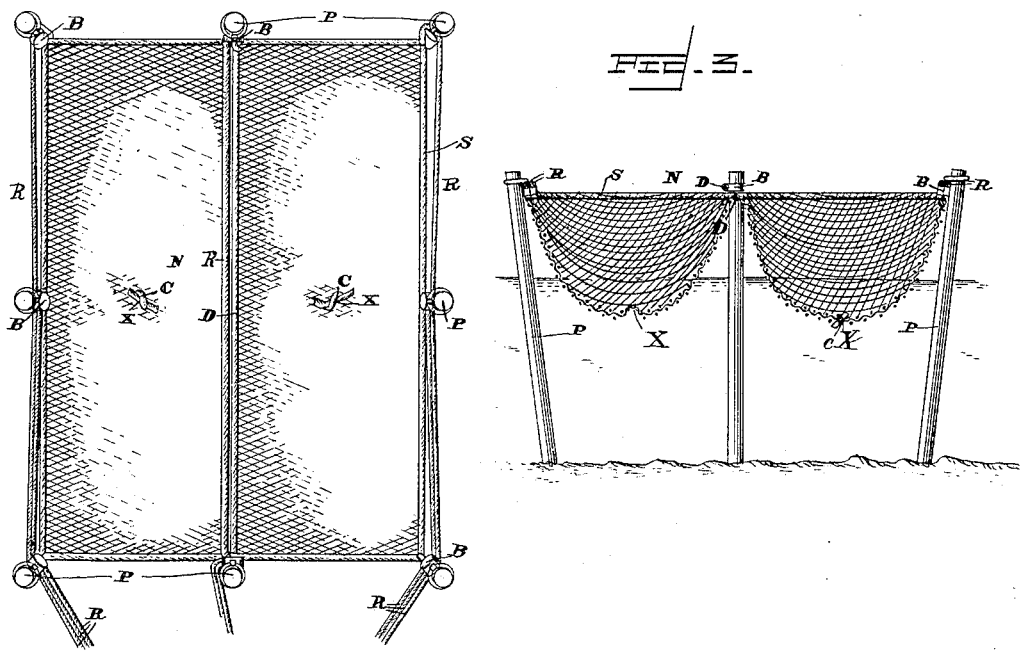
Witnesses
E. S. Duvall Jr.
N. T. Collamer
Inventor
Maggie E. Jones.
By her Attorneys,
C. A. Snow & Co.

UNITED STATES PATENT OFFICE.

MAGGIE E. JONES, OF CASCADE, ARKANSAS.

FISHING-SEINE.

SPECIFICATION forming part of Letters Patent No. 462,258, dated November 3, 1891.

Application filed April 9, 1891. Serial No. 388,255. (No model.)

*To all whom it may concern:*

Be it known that I, MAGGIE E. JONES, a citizen of the United States, residing at Cascade, in the county of Faulkner and State of Arkansas, have invented a new and useful Fishing-Seine, of which the following is a specification.

This invention relates to fishing and trapping, and more especially to net or seine raising devices used in this connection; and the object of the same is to produce certain improvements in devices of this character.

To this end the invention consists in the details of construction hereinafter more fully described and claimed, and as illustrated on the accompanying sheet of drawings, wherein—

Figure 1 is a general perspective view of this device, showing the net as resting on the river-bottom, but omitting the water. Fig. 2 is a plan view showing the net as raised. Fig. 3 is a transverse section showing the net in two divisions, the exit-opening of one being closed and the other open.

Refering to the said drawings, the letter N designates a net or seine having a surrounding rope S, and of the usual or of any preferred construction, with the exceptions hereinafter specified.

P are poles or stakes sunk in the river-bottom, and having pulley-blocks B carried by their upper ends. R are ropes extending from the four corners, and in the present instance from the centers of the longer sides of the net leading over these pulleys, and being connected to a common windlass W, supported on posts on the bank of the river and having a crank-handle H. It is obvious that when the windlass is turned in the proper direction to loosen the ropes the net will sink to the river-bottom; but when the windlass is turned in the opposite direction the edges of the net will be drawn up to the top of the poles.

The letter D designates a division-rope, which is woven through the net and passes around a similar pulley B, attached to one of the poles; but this rope is not connected to the windlass. After the windlass has been turned to draw the net up this rope D is drawn upon to make it taut, and it is obvious that the result will be that whatever sag the net has will be divided—that is to say, the receptacle which contains the fish will be divided longitudinally into two smaller receptacles. At the bottom of each of such receptacles is an exit-opening X, which is preferably formed when the net is woven by omitting the connection between several meshes of the net, and when it is desired to close this exit-opening a cord C is passed through the disconnected meshes and tied in a bow-knot. Thus, after the net has been separated into its divisions, the exit-opening X in each may be opened to drop the fish out, after which the attendant in his boat passes to the next division, opening the exit therein by untying the cord C.

In the present instance I have illustrated a net supported by six poles and additional poles at the centers of its ends over the pulleys, connected to which is passed the division-rope; but it will be understood that in practical use more poles will probably be necessary, and also that it will be necessary to have several division-ropes D, in order that the divisions which they form in the net will be small enough to be handled by the operator. However, this is a matter which experience will settle more satisfactorily than theory. The relative sizes and proportions of parts are also a matter of judgment, as well as the materials to be used.

What is claimed as new is—

1. In a fishing-seine, the combination, with a net having a surrounding rope and provided with exit-openings at the centers of the halves of its body and removable cords closing said openings, of poles seated in the river-bottom and having pulleys at their upper ends, a division-rope leading over the pulleys on opposite poles and extending between said exit-openings to the shore, a windlass on the shore, and ropes leading therefrom over said pulleys to the surrounding rope, as and for the purpose set forth.

2. In a fishing-seine, the combination, with a net having exit-openings at points in its body, removable cords closing the same, and supports for said net, of poles having pulleys at their upper ends and a division-rope passing over said pulleys woven through the net between said exit-openings and extending to
5 the shore, as and for the purpose hereinbefore set forth.

In testimony that I claim the foregoing as my own I have hereto affixed my signature in presence of two witnesses.

MAGGIE E. JONES.

Witnesses:
 A. M. KITTINGER,
 A. C. KITTINGER.